United States Patent [19]
Castles et al.

[11] Patent Number: 6,147,644
[45] Date of Patent: *Nov. 14, 2000

[54] AUTONOMOUS GEOLOCATION AND MESSAGE COMMUNICATION SYSTEM AND METHOD

[75] Inventors: Milford Pike Castles, San Antonio, Tex.; Austin Walker Boyd, Jr., Fredericksburg, Va.; James Andrew Moryl, San Antonio, Tex.

[73] Assignee: Southwest Research Institute, San Antonio, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,604

[22] Filed: Dec. 30, 1996

[51] Int. Cl.[7] .................................................. H04B 7/185
[52] U.S. Cl. ...................................... 342/367; 342/357.09
[58] Field of Search ................................ 342/357, 357.1, 342/367, 357.09, 357.07; 455/427, 428, 440, 456

[56] References Cited

U.S. PATENT DOCUMENTS

| | | | |
|---|---|---|---|
| 4,821,294 | 4/1989 | Thomas, Jr. ............................... | 375/96 |
| 5,043,736 | 8/1991 | Darnell et al. ........................... | 342/357 |
| 5,095,538 | 3/1992 | Durboraw, III .......................... | 455/71 |
| 5,119,504 | 6/1992 | Durboraw, III ......................... | 342/357 |
| 5,161,248 | 11/1992 | Bertiger et al. ............................. | 455/17 |
| 5,187,805 | 2/1993 | Bertiger et al. ......................... | 455/12.1 |
| 5,202,829 | 4/1993 | Geier ....................................... | 364/449 |
| 5,365,451 | 11/1994 | Wang et al. ........................... | 342/357.1 |
| 5,448,773 | 9/1995 | McBurney et al. ..................... | 455/343 |
| 5,678,174 | 10/1997 | Tayloe ................................... | 455/13.1 |

OTHER PUBLICATIONS

M. Pike Castles "Fusion of GPS Technology with Argos for High–Accuracy Location and Tracking Requirements" Paper presented at Argos System Technical Exchange, Sep., 1992.

A. Boyd, M.P. Castles, and J. Moryl "Worldwide Tracking Using GPS–Based Beacons" Paper presented at AIAA Space Programs and Technologies Conference and Exhibit, Sep. 21–23, 1993.

*Primary Examiner*—Gregory C. Issing
*Attorney, Agent, or Firm*—Taylor Russell & Russell, P.C.

[57] ABSTRACT

A system and method for transmitting information to a receiving station via one or more Low Earth Orbit (LEO) satellites includes a device which is capable of operating autonomously to transmit signals to a selected LEO satellite for relay to a receiving station identifying the device and its geolocation including longitude and latitude and/or speed, altitude and heading or course. The device includes a microprocessor which operates a Global Positioning System (GPS) receiver for receiving GPS signals to identify its geolocation and precise time. A nonvolatile memory onboard the device stores LEO satellite ephemeris data, and identification, operational and message formatting information to enable the device to transmit information including voice, data and/or the geolocation of the device to a selected LEO satellite, such as the next visible LEO satellite, for relay to a receiving station. The device may be operated to select the next visible LEO satellite for transmission of information when the satellite is visible and the device is within the LEO satellite visibility range or footprint. Alternatively, the device may select one or more LEO satellites for transmission at selected times and may store information, including geolocation data, when a selected LEO satellite is visible.

56 Claims, 5 Drawing Sheets

AUTONOMOUS GEOLOCATION AND MESSAGE COMMUNICATION SYSTEM AND METHOD

FIELD OF THE INVENTION

The present invention pertains to a system and method for autonomously transmitting the geolocation of a stationary or moving object and/or transmitting messages (voice and/or data) between the object and a geolocation tracking and/or message receiving terminal utilizing a position fixing satellite array, such as the Global Positioning System (GPS), and one or more Low Earth Orbit (LEO) satellite-based signal receiver/transmitters.

BACKGROUND

The development of systems of earth orbiting satellites which carry on-board radio transmitters capable of transmitting respective satellite orbital position and time with great accuracy has resulted in the further development of signal receiver devices which can utilize signals received from several satellite transmitters to determine accurate latitude and longitude of the receiver and also calculate altitude, speed and heading. For example, a constellation of satellites in orbits of about eleven thousand miles above the earth's surface and having an orbital period of about twelve hours, known as the Global Positioning System (GPS), has spawned the development of GPS receivers which can determine latitude and longitude to within about thirty meters (typically) of true position on the earth's surface or in an airborne vehicle. The other above-mentioned parameters can also be easily determined by more complex versions of GPS receivers.

Satellite-borne communications systems have also been developed which utilize a series of geosynchronous satellites, which appear to be stationary relative to a given point on the earth's surface and are capable of transmitting and receiving signals between two points spaced apart on the earth's surface or at altitudes less than the altitudes of the orbiting geosynchronous satellites. The geosynchronous satellite constellations are positioned in well-defined equatorial orbits and provide reliable communications. However, the high orbits of these satellites require significant power for transmitting signals to a receiver via one or more of the satellites.

Although, it is possible to provide means for determining the position of an object, such as a vehicle, on the face of the earth or above the earth's surface, using signals from an array of satellites, such as the GPS system, and then relaying this information to a remote station via a geosynchronous satellite communications system, the power requirements for repeatedly transmitting such position tracking information to a user or users desiring to have remote tracking information available, are significant. However, all of the ramifications of such an arrangement have not been contemplated in the development of applications, both commercial and military, for geolocation satellite systems such as the GPS system. Moreover, as described above, remote tracking information regarding the location of a vehicle or other object must be relayed from the vehicle or object being tracked to the party of interest over a separate communications link. Accordingly, there has been a substantial need, in both military and commercial applications, to be able to determine continuously or at will the location of a stationary or moving object on the face of the earth or in a vehicle above the earth and to provide for communications from the vehicle or object to a particular point utilizing one or more satellites in relatively Low Earth Orbits, sometimes known as LEO satellites.

Communication techniques using LEO satellites have been developed wherein a transmitter attempting to transmit a signal to a receiver by way of a LEO satellite is operated repeatedly or continuously in hopes of establishing communication during times when the LEO satellite is "visible" to the transmitter. A LEO satellite may, for example, be in an orbit of only about 150 miles above the earth's surface and therefore be "visible" for only about 5 minutes to 15 minutes. Accordingly, this type of communication also requires significant electrical power to support the repeated or redundant signal transmissions. Moreover, the satellite communication channel or frequency which is handling the redundant transmissions is thus occupied by these repeated transmissions and is otherwise unavailable for transmitting other information from other sources.

Conventional techniques to reduce redundant signal transmissions are not effective when a communications device is non-stationary and the world-wide location is unknown, and such techniques may be detrimental to reliable communications methods. Moreover, although it is known to control signal transmissions from stationary locations on the Earth's surface at specific times or a reduced set of signal transmission times, based on known LEO satellite visibility times, heretofore there have not been any systems or methods developed for communications from a moving or stationary object to a base station via selected ones of several LEO satellites based on the location of the object and ephemeris data for the LEO satellites, respectively.

Accordingly, there has also been a strongly felt need to develop an autonomous system which is capable of determining the location of a particular object, such as a vehicle or person, on the surface of the earth or thereabove (or even at a subsurface location) which is capable of determining the optimum time to transmit a signal or signals to a selected LEO satellite to eliminate the need for repeated redundant transmissions and allow the communications device to be reduced in size by minimizing its power source (such as a battery) capacity. Still further, it has been deemed desirable to provide an autonomous geolocation and message communications device which may utilize LEO satellites for transmission of geolocation and/or other messages and which is physically small enough to be hand-held and carried by a human user, for example. It is to these ends that the present invention has been developed.

SUMMARY OF THE INVENTION

The present invention provides a method for determining and monitoring the geolocation of an object with a device which includes a computer controlled receiver and transmitter which is operable to (a) receive signals from a satellite system to enable the device to calculate its geolocation, (b) determine the optimum time to transmit the geolocation information and/or other message information to another satellite and then (c) transmit to the other satellite for relay by the other satellite to an information receiving and monitoring station, for example.

The present invention also provides a communications system which includes a microcomputer controlled receiver and transmitter device which may be placed on a stationary or moving object, including a machine or a person carrying the device, which device is operable to receive signals from a satellite-based position determining system, autonomously determine its geolocation based on the signals received from the position determining system, and determine the next available orbiting body or satellite which is capable of receiving information, including the geolocation of the device for relay to an information receiving and monitoring station. The system is also operable to transmit the geolocation of the device and other "messages", including voice and data, for example, to the next available satellite during a period of satellite visibility. The invention also contemplates repeating the aforedescribed process at a predetermined time when the satellite for relaying the information is next available or another satellite becomes available for relay of the device geolocation and other information to the monitoring station.

A preferred embodiment of the device includes a receiver for obtaining time and geolocation measurement information from an array of position or geolocation measurement satellites, a microcomputer and appropriate computer software or programs for calculating the geolocation of the device based on received signals from the satellite array, obtaining from stored data the orbital parameters for other satellites so as to then calculate, based on the current geolocation of the device and satellite orbit information, when the next available relay satellite will be in a position for receiving signals from the device, and commanding a transmitter on the device to transmit signals to the relay satellite when it becomes available and during an optimum time of availability. The device also includes antennas for receiving information from the position determining satellite array and for transmitting the geolocation information and possibly other messages to the relay satellite, and a power source, such as a battery, for operating the receiver, microcomputer and transmitter of the device.

Still further, the geolocation measuring and communicating device includes suitable memory circuits for storing satellite identification data and satellite ephemeris data, identifying data regarding the device itself, desired geolocation measurement intervals and signal transmit intervals to the relay satellite, based on the ephemeris data, as well as message format and relay satellite information receiving parameters. The device may be suitably compact as to be hand-held or hand-carried by a human user or easily mounted on an object such as a land, sea-based or airborne vehicle, for example. Moreover, the device may be operated from an internal battery power source or from an external power source.

The present invention further contemplates a position location and message communication system which is operable to measure the precise time, the worldwide geolocation of a device, including its latitude, longitude, altitude, speed and course, and query a database, including ephemeris data stored in a memory circuit, for one or more relay satellites, such as Low Earth Orbit (LEO) satellites. The system is operable to determine the optimum time to communicate geolocation information and other information (voice and data) by way of a relay satellite or satellites which are visible to the device for only a limited time. Accordingly, the system is operable to calculate, with precision, the period of "visibility" of one or more LEO relay satellites based on the knowledge of the location of the device and the orbital paths of the relay satellites.

The invention still further contemplates a method for determining the geolocation of an object using a Low Earth Orbit (LEO) satellite as an information relay means, by transmitting information to the relay satellite in short duration, precisely timed bursts during a predetermined period of visibility of the selected satellite.

Still further, the present invention contemplates a method and system for autonomously determining and communicating the geolocation of an object using a device which may be programmed with instructions as to when to collect geolocation determining information, when to activate a microcomputer using stored instructional commands and a real time clock, measuring geolocation and time signals from a satellite array, such as the Global Positioning System and, based on the time and geolocation measurements, calculate the optimum time to communicate the geolocation information and other messages, if desired, by way of a LEO satellite using ephemeris data for a selected number of LEO satellites or other orbiting bodies capable of serving as relay devices. The method of the invention also contemplates formatting and transmitting the geolocation information and other messages by way of the selected relay satellite, receiving the message by way of a relay satellite downlink terminal or tracking station and disseminating the geolocation and other message data for display on a suitable display terminal at the tracking station or at a remote station operably connected to the downlink terminal.

Those skilled in the art will further appreciate the above-mentioned advantages and superior features of the invention together with other important aspects thereof upon reading the detailed description which follows in conjunction with the drawing.

DESCRIPTION OF THE PREFERRED EMBODIMENTS

In the description which follows, like elements are marked throughout the specification and drawings with the same reference numerals, respectively. The drawing figures are not intended to be to scale and many elements in the drawing figures are shown in schematic or somewhat generalized form in the interest of clarity and conciseness.

Figure 1:
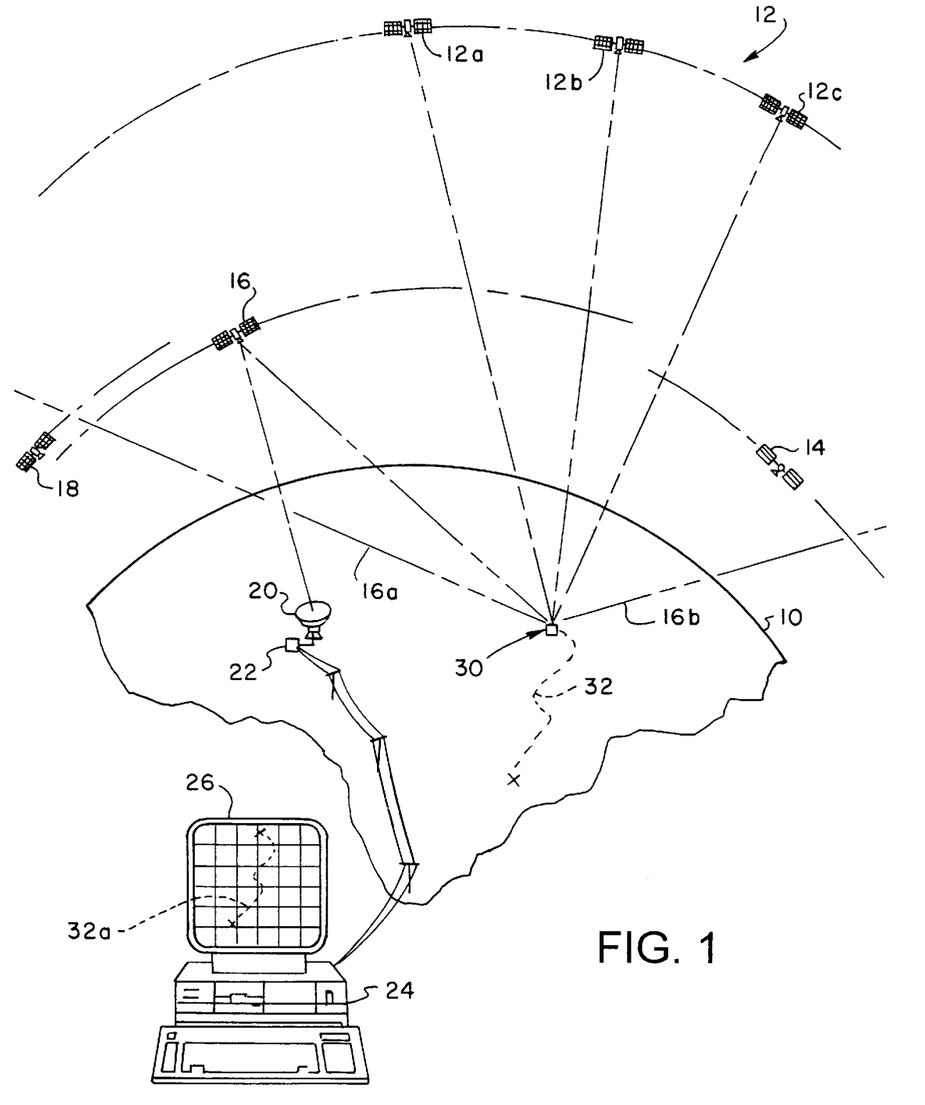
FIG. 1 is a schematic diagram of the autonomous geolocation and message communication system of the present invention.

The system of the present invention is illustrated generally in FIG. 1. Referring to FIG. 1, there is depicted a schematic diagram of a portion of the Earth 10 and a constellation of orbiting bodies or satellites, generally indicated by numeral 12. The satellite constellation 12 includes plural satellites 12a, 12b and 12c, by way of example, which are deployed spaced apart from each other in a relatively high orbit about the Earth 10, in a range of about eleven thousand miles above the Earth's surface, and having a period of about twelve hours each. Only three satellites are shown in the constellation 12 although a much greater number may be deployed. For example, the satellite constellation 12 may comprise the Global Positioning System including a total of twenty-four satellites, including three operational spares, deployed in the orbit mentioned above.

For sake of discussion with regard to this invention, the satellite constellation 12 will be assumed to comprise the Global Positioning System. However, the method and system of the invention may use other satellites capable of transmitting their precise orbital position and precise time or other parameters that will enable calculation of geolocation by receiving such parameters on a continuous or scheduled basis. A more detailed discussion of the Global Positioning System (also known as the NAVSTAR/Global Positioning System) is set forth in U.S. Pat. No. 4,821,294, issued Apr. 11, 1989 to J. B. Thomas, Jr.

Also depicted in FIG. 1 are plural satellites 14, 16 and 18, for example, which are disposed in much lower orbits, and are commonly known as Low Earth Orbit or LEO satellites. LEO satellites are typically deployed in orbits in a range of altitudes of about one hundred miles to eight hundred miles above the nominal surface of the Earth 10. The satellites 14, 16 and 18 may have individual orbits in the above-mentioned range and there may be one or more constellations of plural satellites in essentially the same orbit, spaced apart from each other. Certain satellites also orbit in what are known as Highly Elliptical Orbits (HEO) and other orbit configurations which have somewhat the same visibility or lack of visibility problems associated with LEO satellites. Each of the satellites 14, 16 and 18 may be provided with suitable onboard receiving and transmitting apparatus for receiving and transmitting electromagnetic radiation signals, typically in a microwave or radio frequency (RF) range. Each satellite 14, 16 and 18 may employ a suitable identifier code required to activate its transmitting equipment for relaying information received from a remote transmitter to a receiver on the earth's surface.

For example, as shown in FIG. 1, a signal receiving antenna 20 is disposed on the Earth's surface and is connected to a suitable information receiving and processing terminal 22 which may be in communication with an information receiving, processing and display apparatus, such as a computer or central processor unit 24 having a suitable visual display device or monitor 26 associated therewith. Communication between the terminal 22 and the processor 24 may be via conventional land telephone communication lines 28, or other communications links known to those skilled in the art, for transmitting information electronically. The terminal 22 and processor 24 may be at a common location or remote from each other and considered, collectively, an information receiving and monitoring station.

Referring further to FIG. 1, the system of the present invention includes a device 30 shown disposed essentially on the earth and traversing a predefined or random course 32, although the device 30 may be stationary at any particular time. The I device 30 may, for example, be hand carried by one or more persons, or be disposed on a surface vehicle including a land based vehicle or a marine surface or submersible vessel, or the device 30 may be onboard an aircraft operable in the lower atmosphere or in a path which may take it into orbital or suborbital flight. The terms "on or above" the Earth's surface are intended to encompass such locations of the device 30.

In accordance with the invention, the device 30 includes I means for receiving signals from the satellites 12a, 12b and 12c, for example, from which signals the device 30 is able to determine its geolocation, that is longitude and latitude. Still further, the device 30 may be capable, with the information transmitted to it by the satellites 12a, 12b and 12c, of determining its speed, altitude and its course or heading with respect to the navigation coordinates provided by the system of longitude and latitude lines of position. Still further, the device 30 is capable of referring to ephemerides or ephemeris data stored in the device to determine, based on the geolocation of the device and the use of algorithms embodied in appropriate computer programs stored in a computer associated with or included in the device, when the next available LEO satellite 14, 16 or 18, for example, will be visible to the extent that signals may be transmitted from the device 30 to the selected satellite for relay to the base station or terminal 22, including the signal processor 24 and the display 26 wherein the position of the device 30 may be intermittently or continuously tracked.

The receiving antenna 20 and terminal 22 are positioned at a predetermined geolocation on the Earth 10. A next visible LEO satellite 16 has the means for transmitting information received from the device 30 to the receiving antenna 20 and terminal 22. The device 30 compares the geolocation of the receiving antenna and terminal 22 with respect to the geolocation of the device 30, and transmits information to the next visible LEO satellite 16 when the next visible LEO satellite 16 is in a range of visibility with respect to the device 30 and the receiving antenna 20 and terminal 22.

By way of example, the visual display 26 shows a track 32a representing the course 32 of the device 30 as it moves along or above the surface of the Earth 10, for example. Accordingly, the system and method of the invention contemplates enabling a virtually continuous or at least frequent determination of the position of an object on or above the earth by a remote tracking station such as the processor 24. Clearly, multiple devices 30 may continuously, or at high frequency, determine their geolocation and transmit information identifying such geolocation or other data to the terminal 22 and processor 24 so that a comparison of the location of multiple objects may be made. As mentioned previously, the device 30 may be hand-held by a person carrying the device or the device 30 may be mounted on a surface vehicle or aircraft which is stationary or in motion.

FIG. 1 further illustrates, by way of example, the limits of visibility of the satellite 16, for example, as indicated by lines 16a and 16b. The lines 16a and 16b may define the included angle of the range of visibility of satellite 16 which may require to be so many degrees above the horizon when approaching the device 30 or when receding from the device 30. The angles between lines 16a and 16b and the horizon seen by device 30, respectively, may comprise so-called mask angles which define regions with respect to device 30 in which the satellite 16 is not "visible" to the device 30. Of course, if the satellite 16 is over the horizon it is, normally, also considered to be not visible. Depending on the orbit of the satellite selected for transmitting signals to the terminal 22, the range of the visibility may, of course, vary.

Moreover, the position of the LEO satellite selected for communication of signals, with respect to the antenna 20, for relay to the terminal 22 may also be required to be determined. Each satellite 14, 16 and 18 has a visibility "footprint" which moves across the face of the earth as the satellite traverses its orbit. Accordingly, the device 30 is also adapted to store the geolocation data and other information it desires to transmit to the selected LEO satellite until the calculated time when that satellite becomes visible. At such time the device 30 is then "awakened" to transmit the stored information at an optimum time. Alternatively, the device 30 may be operable to select a LEO satellite, such as any one of the satellites 14, 16 and 18 that is visible at a predetermined desired time or times, for transmission of signals for relay to the terminal 22 and that satellite is employed for the signal relay operation.

Figures 2, 3:
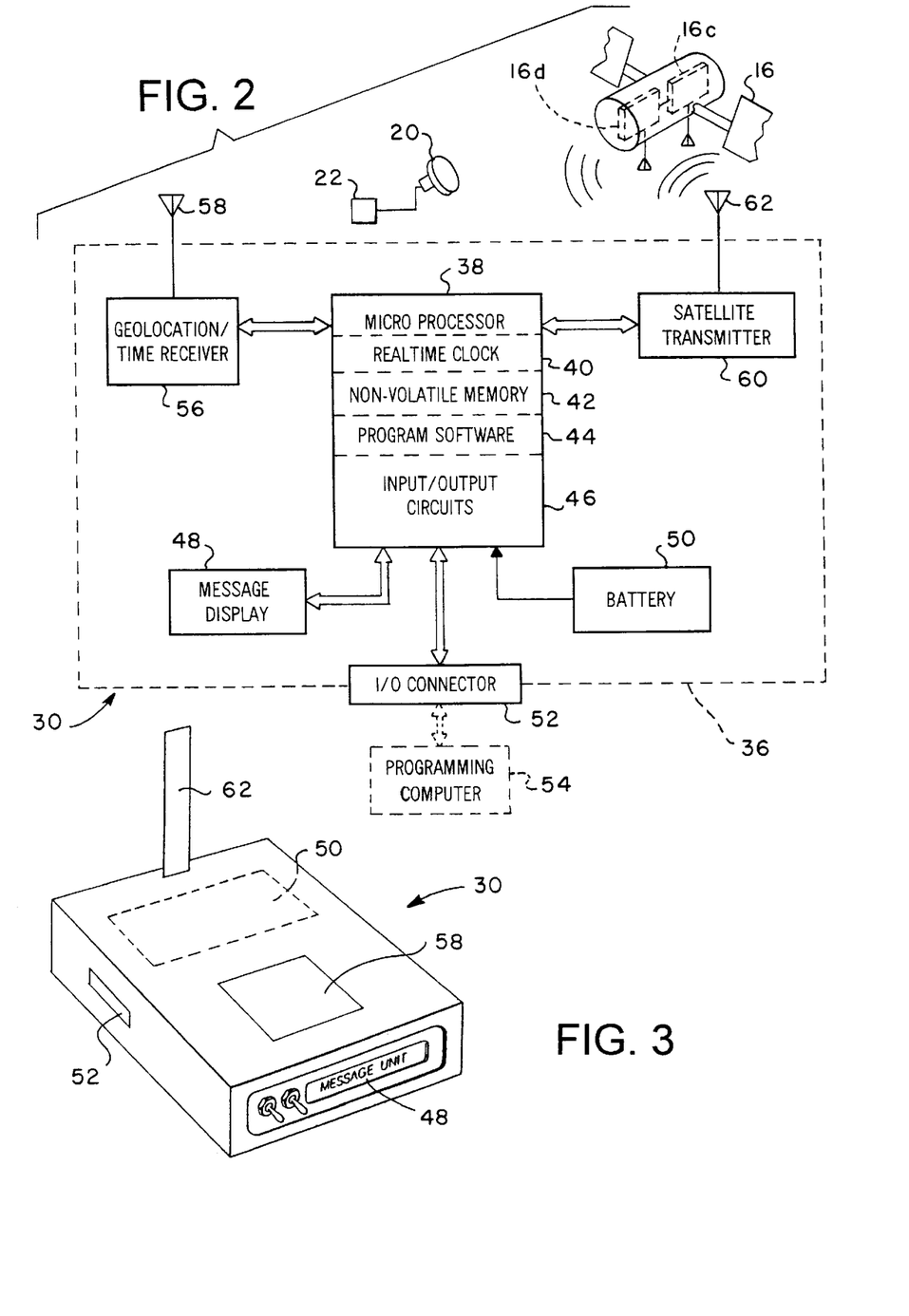
FIG. 2 is a generalized schematic diagram of the autonomous geolocation and communication device for the system of the invention.
FIG. 3 is a perspective view of one embodiment of the device illustrated schematically in FIG. 2.

Referring now to FIG. 2, a generalized schematic diagram of the device 30 is shown wherein the device may include a casing 36 in which a suitable electronic data processor or microprocessor 38 is disposed and is operably connected to a real time clock 40, and a nonvolatile memory 42, all of which are operable in conjunction with program software 44 for carrying out the operations described herein. Suitable input/output circuits 46 are provided for connection to a message display 48, a power source, such as a battery 50, and an input/output connector 52 mounted on casing 36 for connection to a programming computer 54 and an external power source, not shown. The device 30 also includes a suitable circuit comprising a geolocation data and time signal receiver 56 operably connected to an antenna 58 for receiving signals from the satellite constellation 12 to enable the device 30 to calculate, its geolocation with respect to the Earth 10. The receiver 56 is also operably connected to the microprocessor 38.

Still further, the device 30 includes a suitable microwave or. RF signal transmitter 60 operably connected to an antenna 62 for transmitting information or "messages", such as the geolocation of the device 30 and suitable activating information to a receiver and transmitter system onboard the selected LEO satellite, such as satellite 16, shown schematically in FIG. 2. The term "messages" as used herein can include other information such as voice and/or data transmissions. Satellite 16 has a suitable signal receiver 16c operably connected to a transmitter 16d onboard and operable for receiving signals from the transmitter 60 and transmitting signals to the antenna 20 and terminal 22.

The invention contemplates that the device 30 may be substantially self-contained within a relatively small, generally rectangular box-like casing 36, as shown in FIG. 3, wherein a suitable message display 48 is provided along one side of the casing, the input/output connector 52 is provided along another side of the casing and the respective antennas 58 and 62 may be oriented along the top of the casing, as shown. A suitable compartment for housing battery 50 is also provided within the casing 36.

Figure 4:
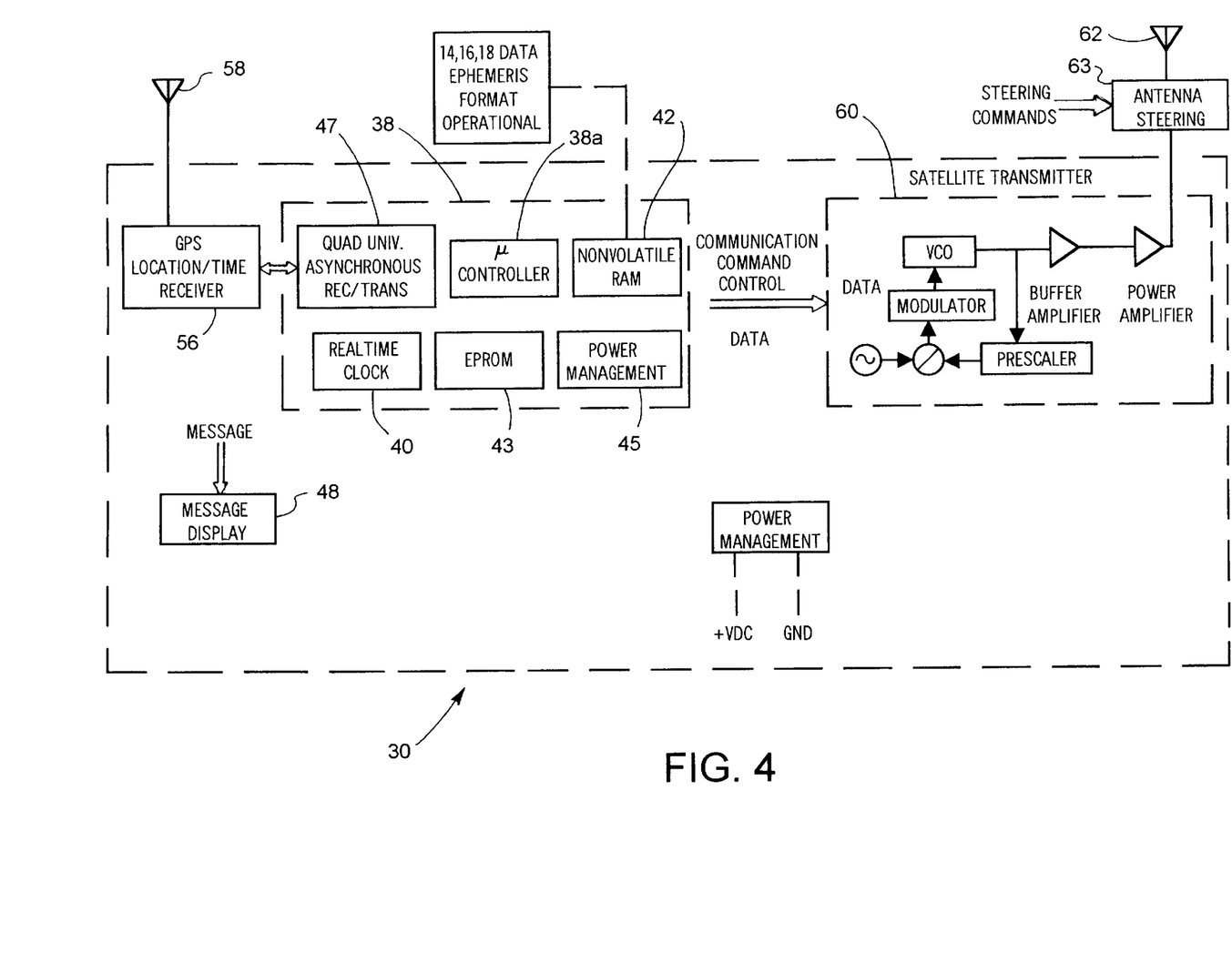
FIG. 4 is a schematic diagram of the device illustrated in FIGS. 2 and 3 in somewhat greater detail.

FIG. 4 is a more detailed schematic diagram of the device 30 showing certain features of the transmitter 60 and the microprocessor 38. The microprocessor 38 includes control and processing circuitry 38a, the real time clock 40, the non-volatile memory 42, an EPROM 43 and power management circuitry 45. The microprocessor 38 is also operably connected to a Quad Universal Asynchronous Receiver/Transmitter (QUART) 47 which interfaces with the receiver 56. FIG. 4 also illustrates a steering mechanism 63 for antenna 62 which is operable to receive antenna position commands from the microprocessor 38. Such mechanism may be employed on devices 30 which are secured to a vehicle or a stationary object. Of course, a hand-held or hand-carryable device 30 may also have a suitable mechanism for aiming or steering antenna 62 to improve signal transmission to a relay satellite such as any one of the satellites 14, 16 and 18. Alternatively, antenna 62 may have omnidirectional characteristics and not require any steering mechanism.

If the antenna 62 includes a steering mechanism 63, the microprocessor 38 may be suitably programmed to provide antenna position commands to the steering mechanism based on the position of the device 30 with respect to the next available satellite which is visible, or a preselected satellite when it is visible and in a suitable position for relay of information to the terminal 22, for example. FIG. 4 further illustrates ephemeris data for each of the satellites 14, 16 and 18, labelled "ephemeris" and which is stored in the nonvolatile memory 42. Data stored in the memory 42 includes ephemeris data, any message formatting requirements, coding or decoding requirements and power and/or satellite receiver operating frequency and data rate requirements for communicating with the particular LEO satellite to which information is to be transmitted for relay to the terminal 22. Ephemeris data may be accurate for several months or longer depending on LEO satellite orbit behavior.

Prior to placing the system of the invention, including the device 30, in operation the microprocessor 38 is initially configured or programmed by a programming computer 54 to carry out the method of the invention and the computer or processor 54 is then disconnected so that the device 30 is operable to perform all of its functions under autonomous and automatic control. Initial programming of the microprocessor 38 includes loading decision making algorithms, operating instructions and ephemeris data for the satellites 14, 16 and 18 into the memory 42. The microprocessor 38 is then activated by the clock 40 at predetermined times to begin a sequence of operations which includes powering up of the receiver 56 and its antenna 58 to acquire measurements from the satellite constellation 12, including the satellites 12a, 12b and 12c or however many satellites are required, to determine the geolocation of the device 30.

Figure 5:
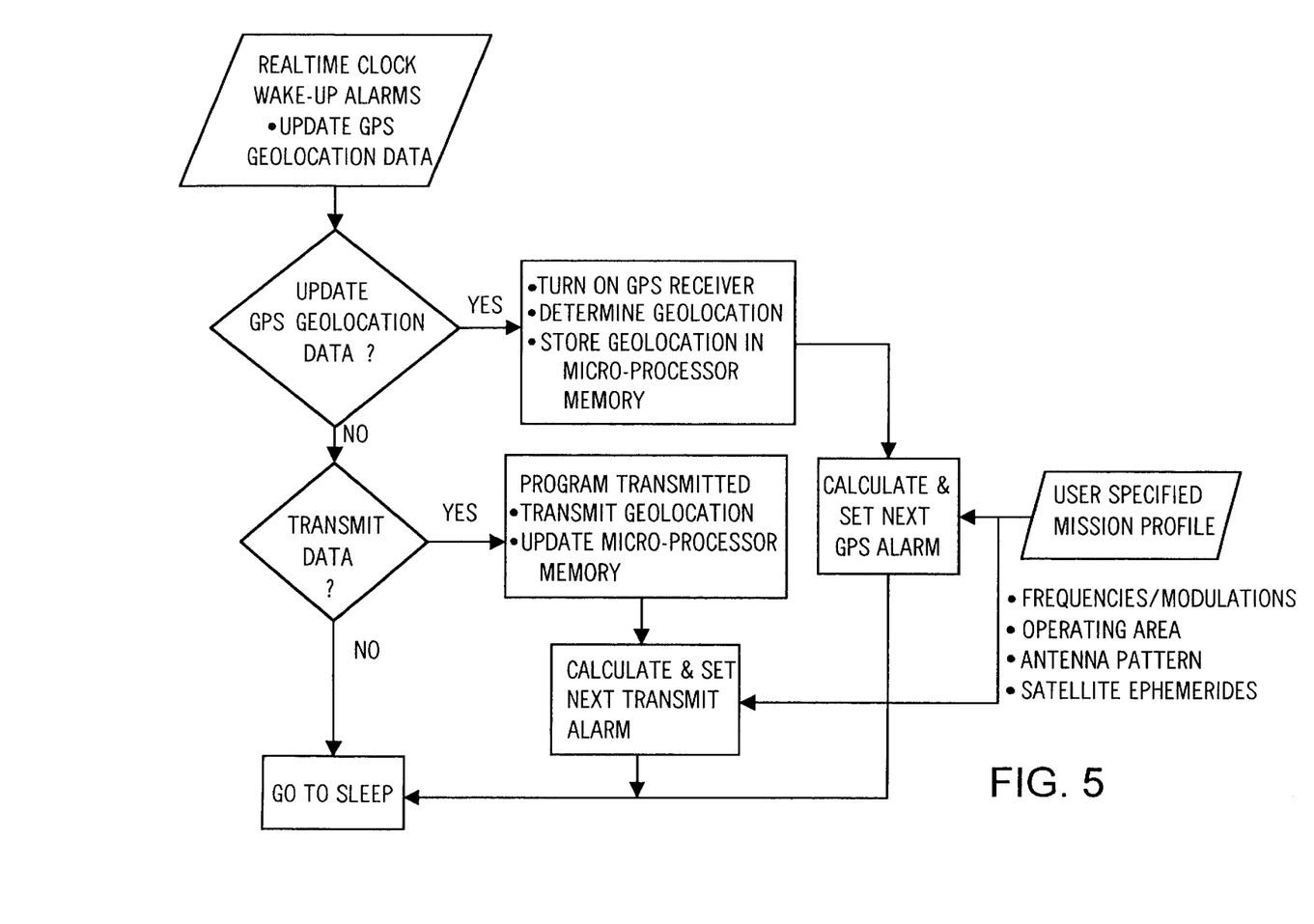
FIG. 5 is a diagram showing the major process steps of the method of the present invention.

FIG. 5 illustrates, in general, the steps carried out by the device 30 in a typical operating sequence. FIG. 5 also illustrates certain of the input information which is supplied to the microprocessor 38 to enable the device 30 to carry out the method of the invention. For example, as illustrated in FIG. 5, the device 30 may have a particular mission which requires transmission of its geolocation and other information at specified times and only if in specified locations and utilizing only specified LEO satellites for relay of the information to a receiver terminal, such as the terminal 22. One or more terminals 22 and antennas 20 may be employed. In this regard, information regarding the general operating area in which the device 30 is to be located before transmission of signals occurs, would be entered into the microprocessor 38, characteristics of the antennas, particularly the antenna 62 and of course, as mentioned above, ephemeris data regarding the LEO satellites through which information is to be relayed.

By way of example, it may be assumed that the device 30 is disposed on a surface vehicle whose geolocation is to be reported as often as possible, utilizing particular LEO satellites for relaying the geolocation of the vehicle to the terminal 22 and the processor 24, whereby tracking of the vehicle on which the device 30 is disposed may be monitored continuously and with substantial accuracy. The ephemeris data regarding the LEO satellites to be used may, depending on the position of the device on the earth's surface, also define the mask angle.

Accordingly, the method of the invention contemplates, by way of example, the following process, assuming that the device 30 has the requisite information stored onboard in the microprocessor 38 and its associated memories. A predetermined interval is selected for powering up the receiver 56 and its antenna 58 to receive precise time and position measurement signals from the satellite constellation 12. The microprocessor 38 normally synchronizes its clock with the time signal from satellite constellation 12. signals are received from the satellite constellation 12, a geolocation or position "fix" is acquired and the information regarding this fix, including longitude and latitude, time, speed and heading is stored in one of the processor memories. Upon acquisition of a position "fix" the receiver 56 is powered down and the microprocessor 38 calculates and sets an alarm signal for repowering up the receiver 56 and acquiring another position fix.

The microprocessor 38 is also then operated to query the ephemeris data for the respective LEO satellites which have been preprogrammed for consideration as use as receivers of information transmitted from the device 30. For example, the microprocessor 38 may be programmed to select the next available LEO satellite which will be visible a sufficient amount of time and in a sufficiently useful position to receive information from the device 30. By way of example, it will be assumed that the microprocessor 38 will query the memory 42 to determine, from ephemeris data stored therein, when the next visible LEO satellite will be in a position to receive signals from the transmitter 60.

Figure 6:
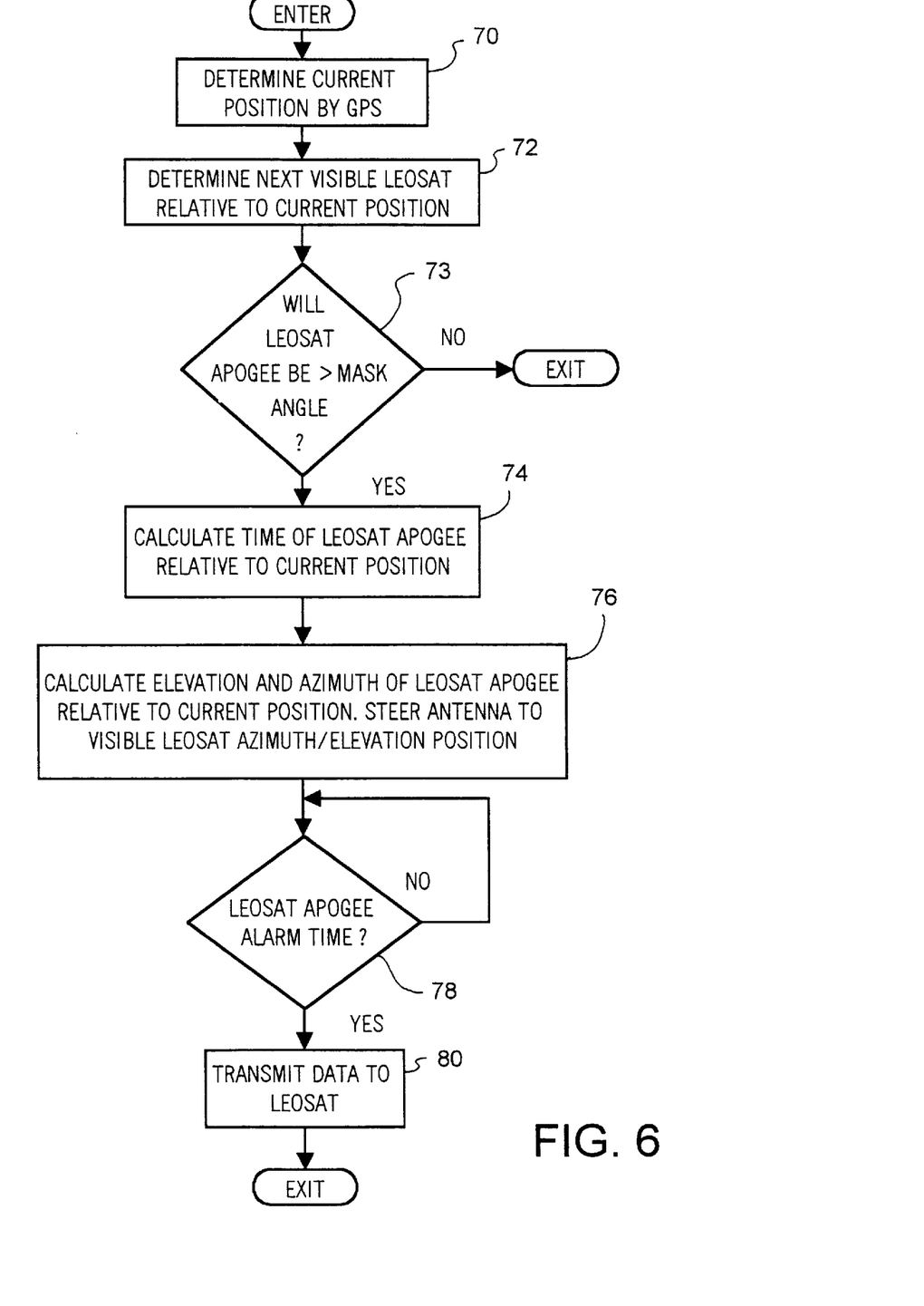
FIG. 6 is a flow diagram showing certain steps in determining the visibility of a Low Earth Orbit (LEO) relay satellite.

Referring to FIG. 6, for example, upon determining the current position by a GPS position fix, as shown in step 70, the microprocessor 38 then determines the next visible LEO satellite relative to its current position as indicated in step 72. The microprocessor 38 then determines whether or not the next LEO satellite will reach an orbital position "higher" than the mask angle for that satellite for the current position or anticipated position of the device 30 when the next visible LEO satellite actually becomes "visible."

If the LEO satellite in question will reach a point above the horizon which is greater than or above its mask angle, the microprocessor 38 then calculates the time of the LEO satellite visibility or a position of the LEO satellite relative to the current position of the device 30 which will enable transmission as indicated at step 74. If the LEO satellite in question will not become truly "visible" for signal transmission at step 73, the microprocessor 38 may query the ephemeris data for all LEO satellites under consideration for transmission of signals thereto to determine when another satellite will become the next visible satellite. Steps 73, 74 and 78 in FIG. 6 reference the LEO satellite orbital apogee. Typically, LEO satellites are in circular orbits and thus do not have an apogee as such. For purposes of discussion herein, the term "apogee" can also mean a point of optimum visibility or a certain range of visibility which is suitable for transmission of information to the LEO satellite.

After calculating the time when the next visible LEO satellite will reach a position of visibility relative to the current position of the device 30, the microprocessor 38 may also calculate the elevation and azimuth of the LEO satellite orbit also relative to the current position of the device 30, as indicated at step 76. This calculation may determine orbital apogee for non-circular orbits. If the satellite elevation and azimuth are such that the current position of the device 30 is within a designated footprint of the LEO satellite in question, a satellite visibility alarm time is set as indicated at step 78 and when this time expires, data is transmitted to the LEO satellite as indicated at step 80. After transmission of data, the transmitter 60 may be powered down while the microprocessor 38 records the position of the device 30 at the time of transmission, updates the memory circuits and then calculates another transmission time for the satellite which is currently visible or for the next visible satellite. A transmit time alarm signal for the transmitter 60 is then set based on the specified parameters of the mission and the next GPS position fix which will give additional meaningful information to the terminal 22 and the processor 24.

Alternatively, if the only available or only desired LEO satellite to which information is to be transmitted is not within the calculated LEO satellite visibility range or "footprint" then a time tagged element of information including geolocation data and any messages is stored in the nonvolatile memory 42, the measurement and calculation interval are repeated at the next wakeup time for the system operating cycle and any stored data is then transmitted when the LEO satellite becomes visible. Again, the optimum next time to communicate through the next LEO satellite is calculated using the latest calculated geolocation and stored satellite ephemeris data. Accordingly, optimal times to communicate with a selected LEO satellite may be periodically determined and stored in a memory circuit of the microprocessor 38 and used as an activation time for transmitter 60 to provide for transmitting signals to a selected LEO satellite.

The microprocessor 38 may also be programmed to transmit the same information more than once to a visible LEO satellite during the period of time that the satellite is visible. For example, information may be transmitted to LEO satellite 16 during the first half of its range of visibility and during the second half of its range of visibility, for example. A typical message may, for example, last less than one second and the message may be transmitted more than once during the visibility of a selected LEO satellite. However, the message may be repeated or retransmitted at a later time to another LEO satellite which has been selected for relay of information to the terminal 22 and the processor 24.

Messages transmitted by a system in accordance with the present invention may include voice signals and a wide variety of data transmission. Data may be prestored in the system and voice signals may be real time or stored in the system, as necessary, depending on satellite visibility suitable for transmission to the LEO or relay satellite and from the relay satellite to the base station. Accordingly, the invention contemplates not only a device which can transmit information regarding its geolocation but the transmission of signals related to many types of information utilizing the method and system of the invention and, which, requires the determination of the geolocation of the device. The method and system of the present invention may, for example, be utilized in telephony wherein communications are carried out during the periods of visibility of the respective satellites for which the system is capable of determining visibility and communication therewith.

The range of signal transmission frequencies for information transmitted by the transmitter 60 may vary from the low frequency VHF portion of the RF band to microwave frequencies. The signal may be modulated using FM, pulse code modulations (BPSK, QPSK, etc.), spread spectrum techniques, or via specialized military waveforms, as required. For purposes of discussion herein all such transmissions are referred to as RF transmissions. The messages are preferably in a digitally encoded format having a preamble, an identifier, and a message portion. These formats may vary from one LEO satellite to the next and formatting information, such as operational frequency, modulation type, power levels and data rate, for example, may be prestored in the nonvolatile memory 42 along with the ephemeris data for the particular satellite in question.

The footprint of a typical LEO satellite is a generally circular area and may, typically, have a diameter of about five thousand kilometers, for example, depending on orbital altitude. Determination of the footprint of a LEO satellite typically involves determining a longitude and latitude of the satellite for optimum signal transmission and carrying out the transmission as long as the location of the device 30 is within the region visible to the satellite.

The foregoing description of the system of the present invention, including the device 30 and the method carried out thereby is believed to be within the purview of one skilled in the art of satellite communications systems based on the description and drawings. Although a preferred embodiment of the system, device and method have been described in detail herein, those skilled in the art will also recognize that various substitutions and modifications may be made without departing from the scope and spirit of the invention as recited in the appended claims.

What is claimed is:

1. A method for communicating geolocation and messages from a device to a receiving station, comprising the steps of:
   a) receiving signals by the device from a position determining system;
   b) determining a geolocation of the device from the received position determining signals;
   c) determining a visibility time duration when a low earth orbit satellite is visible to both the device and the receiving station by using a current time, the device geolocation, the receiving station geolocation, and low earth orbit satellite ephemeris data stored in the device; and
   d) transmitting the geolocation and messages from the device to the low earth orbit satellite during the visibility time duration when the low earth orbit satellite is visible to both the device and the receiving station, for relay to the receiving station by the low earth orbit satellite.

2. A method according to claim 1, wherein the position determining system is the NAVSTAR/Global Positioning System.

3. A method according to claim 1, wherein the step of determining a geolocation comprises the steps of autonomously determining a longitude value and a latitude value of a position of the device and simultaneously and autonomously determining a time value taken at that position of the device.

4. A method according to claim 1, wherein the step of determining a geolocation comprises the steps of autonomously determining a three-dimensional value of a position of the device and simultaneously and autonomously determining a time value taken at that position of the device.

5. A method according to claim 1 further comprising the steps of:
   a) determining a speed value and a heading value of the device from the position determining system; and
   b) transmitting the speed value and the heading value from the device to the low earth orbit satellite during the visibility time duration when the low earth orbit satellite is visible to both the device and the receiving station, for relay to the receiving station by the low earth orbit satellite.

6. A method according to claim 1, wherein the step of determining a visibility time duration when a low earth orbit satellite is visible to both the device and the receiving station, and the step of transmitting the geolocation comprise the steps of:
   a) determining a visibility time duration when each of a plurality of low earth orbit satellites is visible to both the device and the receiving station;
   b) selecting a low earth orbit satellite having a selected visibility time duration from the plurality of low earth orbit satellites; and
   c) transmitting the geolocation and messages from the device to the selected low earth orbit satellite during the selected visibility time duration when the selected low earth orbit satellite is visible to both the device and the receiving station, for relay to the receiving station by the low earth orbit satellite.

7. A method according to claim 6, wherein the step of selecting a low earth orbit satellite comprises the steps of:
   a) comparing the visibility time duration for each of the plurality of low earth orbit satellites; and
   b) selecting a low earth orbit satellite having a selected visibility time duration and a shortest time interval between a present time and a beginning time of the selected visibility time duration.

8. A method according to claim 6, wherein the step of determining a visibility time duration when each of a plurality of low earth orbit satellites is visible to both the device and the receiving station, comprises the step of determining a time duration for each of a plurality of earth orbit satellites when:
   a) an elevation angle of a low earth orbit satellite is greater than a mask angle based on a predicted position of the device; and
   b) a visibility footprint of the low earth orbit satellite indicates a visibility time duration when both the device and the receiving station are contained within the visibility footprint.

9. A method according to claim 1, wherein the step of determining a visibility time duration when a low earth orbit satellite is visible to both the device and the receiving station, and the step of transmitting the geolocation comprise the steps of:
   a) determining a visibility time duration when each of a plurality of low earth orbit satellites is visible to both the device and the receiving station;
   b) selecting more than one low earth orbit satellite having selected visibility time durations from the plurality of low earth orbit satellites; and
   c) transmitting the geolocation and messages from the device to the selected low earth orbit satellites during the selected visibility time durations when the low earth orbit satellites are visible to both the device and the receiving station, for relay to the receiving station by the low earth orbit satellite.

10. A method according to claim 1, wherein the step of determining a visibility time duration when a low earth orbit satellite is visible to both the device and the receiving station, and the step of transmitting the geolocation comprise the steps of:
    a) determining a maximum elevation angle and an azimuth for each of a plurality of low earth orbit satellites based on the device geolocation and satellite ephemeris data stored in the device;
    b) comparing the maximum elevation angle with a device mask angle for each satellite;
    c) identifying each satellite having a maximum elevation angle that exceeds the device mask angle;
    d) selecting identified satellites having a maximum elevation angle that exceeds the mask angle and having a visibility footprint that provides visibility to both the device and the receiving station;
    e) determining a selected visibility time duration for each selected satellite when the maximum elevation angle exceeds the mask angle and when the satellite visibility footprint provides visibility to both the device and receiving station; and
    f) transmitting the geolocation and messages from the device to a predetermined number of the selected low earth orbit satellites during the selected visibility time duration for each of the predetermined number of selected low earth orbit satellites.

11. A method according to claim 10, wherein the step of transmitting the geolocation comprises transmitting the geolocation and messages from the device to a predetermined number of the selected low earth orbit satellites when each of the predetermined number of selected low earth orbit satellites is at its maximum elevation angle.

12. A method according to claim 10, wherein the step of selecting identified satellites further comprises selecting identified satellites having a shortest time interval between a present time and a beginning time of an identified satellite selected visibility time duration.

13. A method according to claim 10, wherein the step of transmitting the geolocation comprises the steps of:
   a) steering an antenna connected to the device to a maximum elevation angle and an azimuth for a selected low earth orbit satellite; and
   b) transmitting the geolocation and messages from the device to the selected low earth orbit satellite during the selected satellite selected visibility time.

14. A method according to claim 1, wherein the step of transmitting the geolocation comprises transmitting the geolocation and messages more than once from the device to the low earth orbit satellite when the low earth orbit satellite is visible to both the device and the receiving station, for relay to the receiving station by the low earth orbit satellite.

15. A method according to claim 1, wherein the step of transmitting the geolocation comprises transmitting the geolocation and messages at least once during a first half of the visibility time duration, and at least once during a second half of the visibility time duration.

16. A method according to claim 1, wherein the step of receiving signals by the device comprises:
   a) receiving signals by a receiver in the device from a position determining system at a set of predetermined times; and
   b) reducing power to the receiver at times between the set of predetermined times.

17. A method according to claim 1, wherein the step of transmitting the geolocation comprises:
   a) selecting a transmitter power level;
   b) transmitting the geolocation and messages by a transmitter in the device to the low earth orbit satellite during the visibility time duration when the low earth orbit satellite is visible to both the device and the receiving station, for relay to the receiving station; and
   c) reducing the transmitter power level at times the transmitter is not transmitting the geolocation and messages.

18. A method according to claim 1, further comprising the step of preprogramming the device with operational parameters.

19. A method according to claim 18, wherein the operational parameters comprise ephemeris data, operating area information, identity codes, and transmission data formats for a plurality of low earth orbit satellites.

20. A method according to claim 18, wherein the preprogramming step is performed by downloading the operational parameters to the device from a computer connected to a connector positioned on the device.

21. A method according to claim 1, wherein the step of transmitting the geolocation data further comprises selecting a data rate, modulation format, data format, transmission frequency and signal transmission power level for compatibility with a selected constellation low earth orbit satellites.

22. A method according to claim 1, wherein the step of receiving signals from a position determining system is performed by a receive antenna and the step of transmitting the geolocation is performed by a transmit antenna.

23. A method according to claim 1, wherein the step of receiving signals from a position determining system comprises receiving signals from at least three earth orbit position determining satellites.

24. A method according to claim 1, wherein the receiving station comprises more than one receiving station.

25. A method according to claim 1, wherein the messages includes voice and data information.

26. A device for communicating geolocation and messages to a receiving station, comprising:
   a) means for receiving signals by the device from a position determining system;
   b) means for determining a geolocation of the device from the received position determining signals;
   c) means for determining a visibility time duration when a low earth orbit satellite is visible to both the device and the receiving station by using a current time, the device geolocation, the receiving station geolocation, and low earth orbit satellite ephemeris data stored in the device; and
   d) means for transmitting the geolocation and messages from the device to the low earth orbit satellite during the visibility time duration when the low earth orbit satellite is visible to both the device and the receiving station, for relay to the receiving station by the low earth orbit satellite.

27. A device according to claim 26, wherein the position determining system is the NAVSTAR/Global Positioning System.

28. A device according to claim 26, wherein the receiving station includes a means for displaying a track depicting the geographical movement of the device.

29. A device according to claim 26, wherein the means for receiving signals from a position determining system comprises an omnidirectional receive antenna connected to a geolocation data and time signal receiver.

30. A device according to claim 29, further comprising a power management means for reducing power to the geolocation data and time receiver at times the receiver is not receiving.

31. A device according to claim 26, wherein the means for determining a geolocation from the received position determining signals comprises:
   a) a microprocessor connected to a geolocation data and time signal receiver;
   b) a real time clock connected to the microprocessor;
   c) a nonvolatile memory connected to the microprocessor for storing control program software for computing geolocation; and
   d) a computer program stored in the nonvolatile memory for controlling the microprocessor to compute a geolocation.

32. A device according to claim 31, wherein the computer program controls the microprocessor for autonomously computing a longitude value, a latitude value and a time value of the position of the device.

33. A device according to claim 31, wherein the computer program controls the microprocessor for computing a speed value and a heading value of the device motion.

34. A device according to claim 26, wherein the means for determining a visibility time duration comprises:
   a) a microprocessor;

b) a nonvolatile memory connected to the microprocessor for storing control program software, low earth orbit satellite ephemeris data and operating area information;

c) a geolocation stored in memory; and d) a computer program stored in nonvolatile memory for controlling the microprocessor to compute a visibility time duration.

35. A device according to claim 34, wherein the computer program controls the microprocessor for computing the visibility time duration using a present time, the device geolocation, a receiving station geolocation, and low earth orbit ephemeris data stored in nonvolatile memory.

36. A device according to claim 34, wherein the computer program controls the microprocessor for determining a visibility time duration when an elevation angle of a low earth orbit satellite is greater than a mask angle and a visibility footprint of the low earth orbit satellite contains both the device and the receiving station.

37. A device according to claim 26, wherein the means for transmitting the geolocation comprises:

a) a satellite transmitter connected to a microprocessor; and b) a transmit antenna connected to the satellite transmitter.

38. A device according to claim 37, further comprising an antenna steering means connected to the microprocessor and the transmit antenna for steering the transmit antenna to an azimuth angle and an elevation angle.

39. A device according to claim 37, wherein the transmit antenna is an omni-directional antenna.

40. A device according to claim 37, further comprising a power management means for reducing power to the satellite transmitter at times the transmitter is not transmitting.

41. A device according to claim 37, further comprising a means for controlling a data rate, modulation format, data format, transmission frequency and signal transmission power level of the satellite transmitter by the microprocessor.

42. A device according to claim 26, further comprising a message display unit, a power source and an input/output connector.

43. A device according to claim 26, further comprising a means for preprogramming the device by downloading operational parameters to the device from a computer connected to a connector positioned on the device.

44. A system for communicating geolocation and messages from a device to a receiving station, comprising:

a) a position determining system for transmitting position determining signals;

b) a device for:
  1) receiving the position determining signals;
  2) determining geolocation of the device;
  3) determining a visibility time duration when a low earth orbit satellite is visible to both the device and a receiving station by using a current time, the device geolocation the receiving station geolocation, and low earth orbit satellite ephemeris data stored in the device; and
  4) transmitting the geolocation and messages from the device to a low earth orbit satellite during the visibility time duration;

c) a low earth orbit satellite for receiving the geolocation and messages from the device and transmitting such information to a receiving station; and d) a receiving station for receiving the geolocation and messages, processing such information, and displaying such information.

45. A system according to claim 44, wherein the position determining system is the NAVSTAR/Global Positioning System.

46. A system according to claim 44, wherein determining geolocation comprises determining a longitude value, a latitude value, and an associated time value of the device.

47. A system according to claim 46, further comprising determining a speed value and a heading value of the device.

48. A system according to claim 44, wherein determining geolocation comprises determining a three-dimensional value of the position and an associated time value of the device.

49. A system according to claim 44, wherein determining a visibility time duration is based on low earth orbit satellite ephemeris data, mask angles, maximum elevation angle and associated azimuth, satellite visibility footprint, and receiving station location.

50. A system according to claim 44, wherein the low earth orbit satellite comprises a receiver and a transmitter for relaying geolocation and messages from the device to the receiving station.

51. A microprocessor-implemented computer program for communicating geolocation and messages from a device to a receiving station, comprising the steps of:

a) receiving signals by the device from a position determining system by controlling a geolocation data and time signal receiver;

b) determining a current geolocation of the device from the received position determining signals;

c) determining a visibility time duration when a low earth orbit satellite is visible to both the device and the receiving station by using a current time, the device geolocation, the receiving station geolocation and low earth orbit satellite ephemeris data stored in the device; and d) transmitting the geolocation and messages from the device to the low earth orbit satellite during the visibility time duration when the low earth orbit satellite is visible to both the device and the receiving station, for relay to the receiving station, by controlling transmission of a device satellite transmitter.

52. A microprocessor-implemented computer program according to claim 51, wherein the step of receiving signals by the device by controlling a geolocation data and time signal receiver comprises the steps of:

a) applying power to the receiver;

b) activating the receiver for receiving position determining signals;

c) acquiring position determining signals;

d) storing the position determining signals in a memory; and e) reducing power to the receiver.

53. A microprocessor-implemented computer program according to claim 51, wherein the step of determining a geolocation of the device comprises the steps of:

a) accessing the position determining signals from the memory;

b) computing a geolocation from the position determining signals comprising a longitude value, a latitude value, and a time value; and c) storing the geolocation in the memory.

54. A microprocessor-implemented computer program according to claim 51, wherein the step of determining a visibility time duration comprises the steps of:

a) computing a maximum elevation angle and an associated azimuth for each of a plurality of low earth orbit satellites based on the device geolocation and satellite ephemeris data stored in memory;

b) comparing the maximum elevation angle with a device mask angle for each satellite;

c) identifying each satellite having a maximum elevation angle that exceeds the device mask angle;

d) selecting identified satellites having a maximum elevation angle that exceeds the mask angle and having a visibility footprint that provides visibility to both the device and the receiving station; and e) determining a selected visibility time duration for a selected satellite having a maximum elevation angle that exceeds the mask angle when the visibility footprint of the selected satellite provides visibility to both the device and the receiving station.

55. A microprocessor-implemented computer program according to claim 51, wherein the step of transmitting the geolocation and messages from the device to the low earth orbit satellite by controlling transmission of a device satellite transmitter comprises the steps of:

a) applying power to the device satellite transmitter;

b) setting transmission parameters of the device satellite transmitter comprising data rate, modulation format, data format, transmission frequency, and signal transmission power level;

c) transmitting the geolocation and messages from the device satellite transmitter to the low earth orbit satellite during the visibility time; and d) reducing power to the device satellite transmitter.

56. Computer readable medium containing instructions for performing the steps in the computer program as recited in claim 51.

* * * * *